United States Patent [19]

Carter

[11] 4,442,414

[45] Apr. 10, 1984

[54] MAGNETO-OPTICAL PHASE-MODULATING DEVICES

[75] Inventor: Walter S. Carter, Bracknell, England

[73] Assignee: British Aerospace Public Limited Company, London, England

[21] Appl. No.: 255,027

[22] Filed: Apr. 17, 1981

[30] Foreign Application Priority Data

Apr. 29, 1980 [GB] United Kingdom ............... 8014087

[51] Int. Cl.³ ........................... G02F 1/05; G02B 5/08
[52] U.S. Cl. .................................. 332/7.51; 356/350
[58] Field of Search ............. 332/7.51; 356/350, 374, 356/375

[56] References Cited

U.S. PATENT DOCUMENTS

| | | | |
|---|---|---|---|
| 3,851,973 | 12/1974 | Macek | 356/350 |
| 4,082,424 | 4/1978 | Santes et al. | 350/375 |
| 4,195,908 | 4/1980 | Kestigian et al. | 356/350 |
| 4,201,450 | 5/1980 | Trapani | 350/374 |
| 4,219,275 | 8/1980 | Henry | 356/350 |
| 4,222,668 | 9/1980 | Henry | 356/350 |
| 4,225,239 | 9/1980 | Prinz | 356/350 |
| 4,246,549 | 1/1981 | Carter et al. | 356/350 |

OTHER PUBLICATIONS

Whitcant et al., "Fabrication of . . . Laser Applications", 2/78, J. A. Phys., vol. 49, #3.

Krebs et al., "Applications of Magneto-Optics in Ring Laser Gyroscopes", 9/80, IEEE Tran. on Mag., vol. MAG 16, #5.

Primary Examiner—Nelson Moskowitz
Attorney, Agent, or Firm—Cushman, Darby & Cushman

[57] ABSTRACT

A magneto-optical phase-modulating device comprising a magneto-optic layer (3) forming part of an optical stack and upon which, in use, light is incident and to which is applied a magnetic field, a layer of magnetic material (6) adjacent the magneto-optic layer (3), and at least two flat, low inductance conductors (9,12) connected in series and disposed one on either side of the layer of magnetic material (6), in use the conductors (9,12) having an electric current applied thereto to provide a magnetic field in the layer of magnetic material (6), which magnetic field is switchable between one direction and the opposite direction by reversing the current in the conductors (9,12) and is of a strength relative to that of the magnetic field applied to the magneto-optic layer (3) such that the latter field is also switched between said one direction and the opposite direction as the field associated with the layer of magnetic material (6) is switched.

14 Claims, 6 Drawing Figures

MAGNETO-OPTICAL PHASE-MODULATING DEVICES

This invention relates to magneto-optical phasemodulating devices operable to modulate light incident thereon. These devices may be employed in ring lasers and the invention will be discussed in the main with reference to ring lasers, and more specifically laser gyroscopes, but it is to be understood that it is not limited to this particular application.

As is well known, a ring laser employs two beams of light propagated in opposite directions around the ring or so-called cavity. In an ideal ring laser, the frequency difference between the beams of light is zero when the ring is stationary but moves from zero when the ring is rotated about its axis, the frequency difference being proportional to the angular rotation rate of the cavity. Thus a ring laser is capable of functioning as a rate gyroscope. In practical ring lasers, however, there are many effects that degrade the performance, the majority of these are linked in some way to the amount of light that is lost in traversing the cavity. One of the most dominant, and hence troublesome, effect is lock-in which is caused by light scattered from each beam interacting with the opposite beam, suppressing the frequency difference at low rotation rates, and making the frequency difference non-linear at just above the lock-in frequency.

When a ring laser is used as a gyroscope, the two output light beams are combined to provide interference fringes which may be counted by a photodetector. The fringe count is directly proportional to the total angle the ring laser has turned through provided the two beams of light are completely uncoupled. The ratio of the fringe count per unit angle of rotation is known as the scale factor. As a result of lock-in, no fringes will occur up to the lock-in threshold and the scale factor will be non-linear for a range of rotational rates above the lock-in threshold, both these phenomena seriously degrading the accuracy of the ring laser gyroscope.

One method of avoiding the lock-in problem is to impart a bias to the ring laser such that a non-reciprocal phase shift is introduced to the contradirectional light beams. Various biasing techniques have been proposed ranging from a mechanical arrangement (known as "dither"), which oscillates the entire ring laser at a small amplitude, to magneto-optical arrangements. The magneto-optical arrangements fall in two categories, namely Faraday cells and magnetic bias mirrors. In the Faraday cell biasing devices, a paramagnetic or ferrimagnetic material, transparent to the laser wavelength, is inserted in the cavity in the paths of the two light beams. This arrangement suffers the disadvantage that high quality, and hence expensive, optical components have to be employed and furthermore, these components may give rise to increased light scatter which therefore adds to the lock-in problem.

As regards the magnetic bias mirror, this replaces one of the usual three "corner" mirrors of the ring laser and an example is disclosed in British Patent Specification No. 1,406,730. In this example, the mirror comprises a ferromagnetic layer formed on a substrate and overcoated with layers of dielectric materials to give, among other things, the ferromagnetic layer sufficient reflectivity to produce a ring laser of a sufficient quality for gyroscopic purposes. In use, a magnetic field is applied to the ferromagnetic layer in the plane of the mirror and perpendicular to the plane of the laser cavity so as to exploit the transverse Kerr magneto-optic effect which results in a phase difference being imparted to the contradirectional light beams in addition to that created by any rotation of the ring laser, whereby the ring laser can be operated always with a linear scale factor even if the actual rate of rotation being sensed is below the lock-in threshold. As well as introducing the required phase difference, the transverse Kerr magneto-optic effect introduces an amplitude difference between two light beams by way of non-reciprocal reflectivity of the mirror. This has the detrimental effect on the performance of a laser gyroscope and needs to be minimised for optimum gyroscope performance. To this end, use is made of a layer of dielectric material immediately next to the ferromagnetic layer, the dielectric layer (termed the "control layer") being of a modified thickness compared with the adjacent dielectric layers which normally have a quarter-wave optical thickness.

The advantages of the magnetic bias mirror are that it is non-mechanical, it can be subjected to switching as regards the magnetic field applied to the magneto-optical layer so as to reverse the bias as required, and the bias is defined by the saturation moment of the magnetic material as opposed to being defined by the magnitude of the magnetising drive current as it would be using paramagnetic materials. Switching also makes the bias independent of changes in saturation moment due to temperature drift.

However, whilst switching of the magnetic field applied to the ferromagnetic layer can be effected relatively fast (of the order of one microsecond), this is not fast enough when turn rates of the order of 400°/second have to be accommodated in missiles, for example. The required speed of switching to cope with this environment cannot be accomplished using known techniques in conjunction with the magnetising coils associated with the ferromagnetic layer of known magnetic bias mirrors. Clearly, the switch over time must be short compared with the desired resolution if fringe counts are not to be missed.

It is the object of the present invention to provide a magneto-optical phase-modulating device utilizing a Faraday cell or a transverse Kerr effect device which enables switching of the field applied to the magneto-optical layer at a speed which is in excess of that presently attainable with known magnetic coil arrangements.

According to the present invention there is provided a magneto-optical phase-modulating device comprising a magneto-optic layer forming part of an optical stack and upon which, in use, light is incident and to which is applied a reversible magnetic field, a layer of magnetic material adjacent the magneto-optic layer, and at least two flat, low inductance conductors connected in series and disposed one on either side of the layer of magnetic material, in use the conductors having an electric current applied thereto to magnetize in the layer of magnetic material, which megnetization is switchable between one direction and the opposite direction by reversing the current in the conductors and which induces an external field of a strength to magnetically affect the magneto-optic layer such that the consequent magnetization thereof is also switched between said one direction and the opposite direction as the field associated with the layer of magnetic material is switched.

Preferably at least one of the conductors is a stripline conductor and desirably each conductor is of this type.

The use of flat conductors gives rise to a low inductance arrangement because the magnetic field created by passing electrical current through the conductors is confined to the proximity of the conductors which means that very fast current pulses can be passed down the conductors with an attendant very fast switching of the magnetic field.

The magneto-optic layer and magnetic layer, when provided, are preferably of the thin film type whereby they have a strong shape anisotropy which confines the magnetic moment to the plane of the film. Within the plane of the film or layer there is a small uniaxial anisotropy so that the magnetisation lies in one of two directions parallel to the so-called "easy" magnetic axis. Such films or layers can have applied magnetic fields switched between one sense and the opposite sense along the easy axis by relatively small applied fields.

The direction of magnetisation in a thin film can be changed in two ways, namely by domain wall motion and by rotation, the latter being preferred since it results in faster switching. Accordingly, the field applied either directly or indirectly to the magneto-optic layer has at least a component in the direction of the hard axis and this can be accomplished either by applying the field at an angle to the easy or hard axis or by applying two orthogonal fields substantially along the easy and hard axes, respectively, and arranging for the field in the direction of the hard axis to be switched off prior to that in the direction of the easy axis.

It is desirable to make the magnetic layer of a magnetically saturable material having a square loop hysteresis characteristic so that it will maintain the magneto-optic layer magnetically saturated even if that layer does not have a square loop hysteresis characteristic.

Magneto-optical phase-modulating devices constructed in accordance with the present invention will now be described in greater detail, by way of example, with reference to the accompanying diagrammatic drawings, in which.

Figure 1:
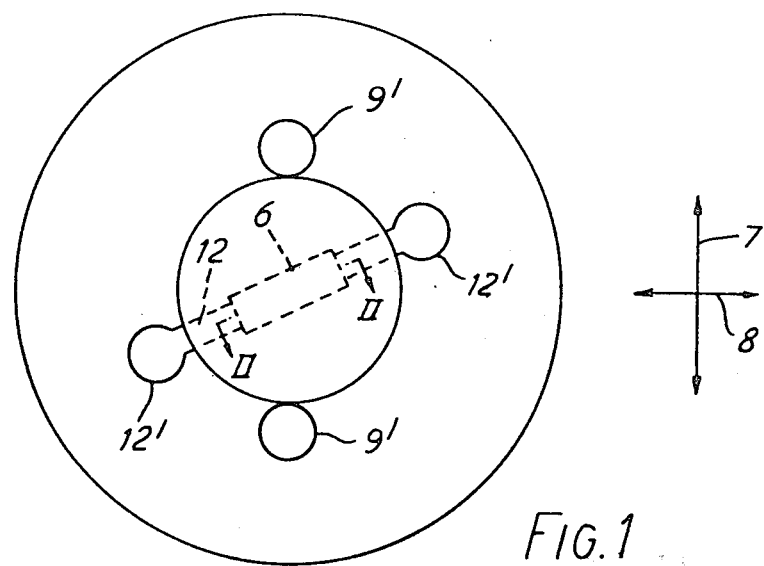
FIG. 1 is a plan view of one device in accordance with the invention.
Figure 2:
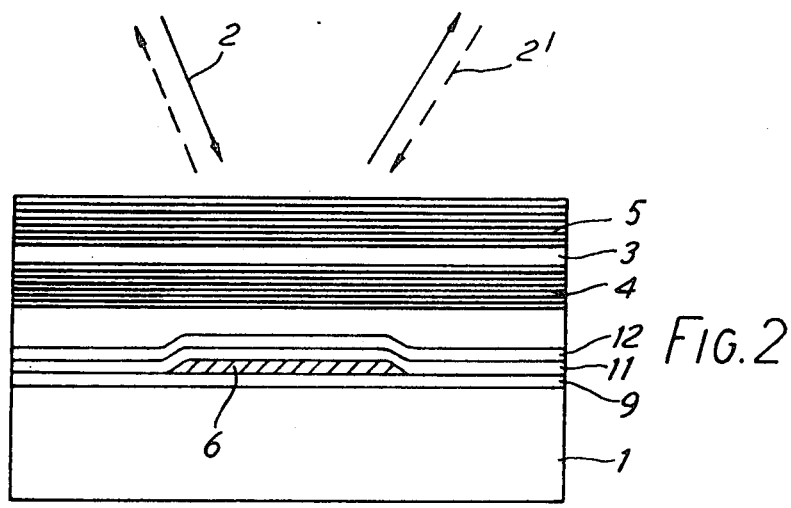
FIG. 2 is a section on line II—II of FIG. 1.

The two illustrated embodiments are in the form of magnetic bias mirrors for a ring laser gyroscope and that shown in FIGS. 1 and 2 compises a substrate 1 on which is formed an optical stack upon which, in use, two beams of light 2 and 2' are incident and from which the incident beams are reflected as indicated in FIG. 2. The optical stack comprises a magneto-optic layer 3 behind which, with respect to the incident light 2, 2', is a highly reflective layer 4 in the form of a multilayer stack of two dielectric materials disposed alternately. In order to limit the amount of incident light 2, 2' reflected from the air/layer 3 interface, an anti-reflective layer 5 is provided on top of the magneto-optic layer 3, the anti-reflective layer 5 also comprising a multilayer stack of two alternating dielectric materials.

The dielectric materials used in the layers 4 and 5 may be magnesium fluoride and zinc sulphide and the magneto-optic layer may be composed of a ferromagnetic garnet, the general construction of the optical stack thus being similar to that disclosed in British Patent Specification No. 2,006,456A.

Between the substrate 1 and the reflective layer 4 there is provided a film of a saturable magnetic material 6 having a square loop hysteresis characteristic and a low in-plane anisotropy. A suitable magnetic material having these characteristics is a nickel-iron alloy (80% Nickel, 20% Iron) but others may be used. The film 6 is deposited by any conventional method and is typically between 1,000 and 2,000 Angstroms thick so as to have a strong shape anisotropy giving rise to easy and hard magnetic axes 7 and 8 (FIG. 1) which are generally aligned with the respective magnetic axes of the magneto-optic layer 3. The magnetic film 6 is deposited on a ground conducting layer 9 of gold or other conductive material which in turn is deposited on the substrate 1 by any conventional method. An insulating layer 11 is provided over the magnetic film 6 and on top of the insulating layer there is provided a stripline conductor 12 connected electrically in series with the ground layer 9. The mirror has an overall diameter of 25 mm with the magneto-optic layer 3 and magnetic layer 6 having a diameter of 15 mm.

Contact pads 9' and 12' are provided for the ground layer 9 and stripline conductor 12, respectively, for application of electric current to the conductor 12 which is returned via the ground layer 9. The conductor 12 and ground layer 9 are typically each of a thickness of 10,000 Angstroms and are spaced apart by about 3,000 Angstroms, whereby they are of very low inductance as the magnetic field created by electric current passing therethrough is confined to the proximity thereof. Accordingly, if very fast current pulses are propagated down the conductor 12 and ground layer 9 (of one sense or another), the magnetic field thus applied to the magnetic film 6 will follow the sense of the pulses, whereby very fast switching of the magnetic film is obtained.

It is required that the conductor 12 and the ground layer 9 be relatively closely spaced (S) compared with their widths (W), the relationship $S \leq 0.1W$ being satisfactory in this respect although it does not have to be applied rigidly. Also, the conductor 12 should have a length greater than its width, and a generally low electrical resistance. If the conductor 12 is of aluminium, then a length of 2 cm, a width of 1 mm and a thickness of 1 $\mu$m gives a resistance of 0.6 ohms which is acceptable.

The strength of the magnetization applied to the magnetic film 6, coupled with the close spacing of the film 6 and the magneto-optic layer 3, results in the former influencing the latter to the extent that the consequent magnetization of the magneto-optic layer 3 is switched in accordance with the switching of the magnetic field of the magnetic film 6. More specifically, the magneto-optic layer 3 is switched by stray flux from the magnetic film 6 to form a closed flux situation which gives the lowest energy condition. As seen from FIG. 1, the stripline conductor 12 is arranged at an angle, preferably between 20° and 30°, to the hard magnetic axis 8, and hence at an angle to the easy magnetic axis 7, so that components of the magnetic field created by current passing through the conductor lie in the directions of both the easy and hard magnetic axes of the magnetic film 6. In this way, the magnetic field is changed by rotation rather than by domain wall motion which is a slower process.

Figure 6:
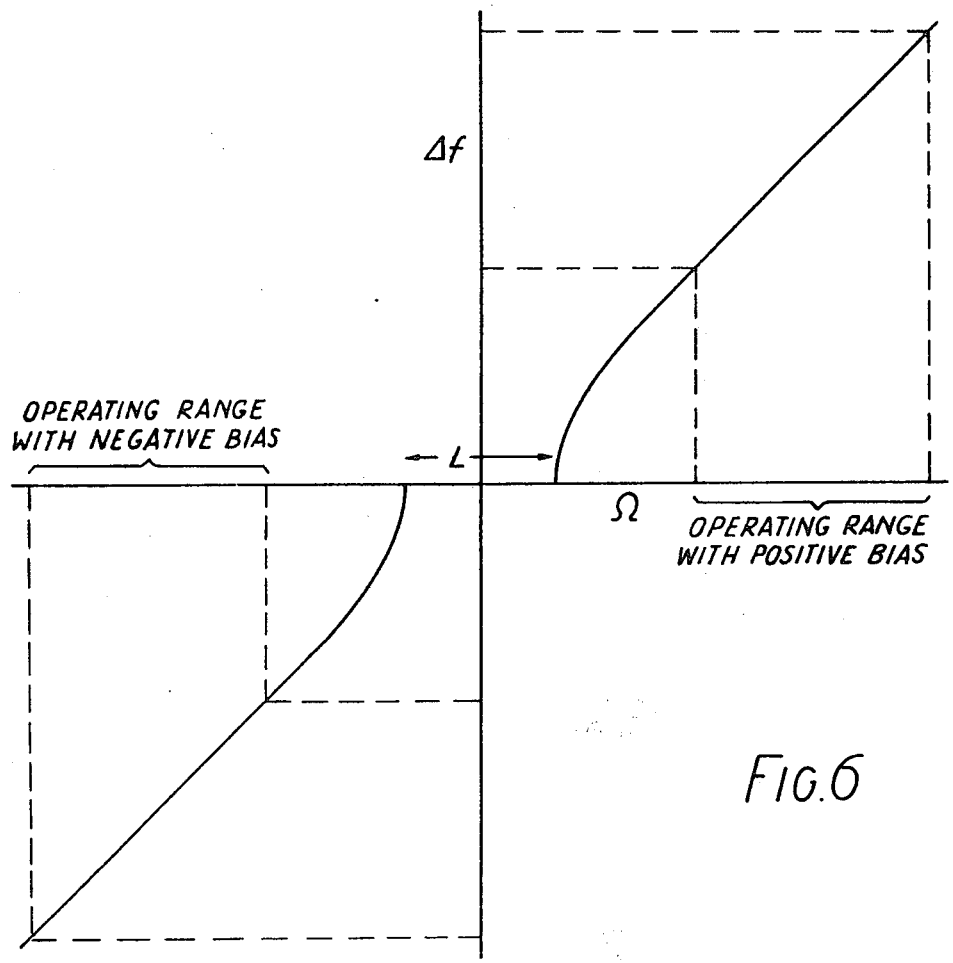
FIG. 6 is a diagram helpful in explaining the operation of the devices of FIGS. 1 and 3.

Thus, very fast switching (of the order of nanoseconds) of the magnetic field of the magneto-optic layer 3 is achieved which means that any rates of turn of the gyroscope in which the magnetic mirror is fitted can be accommodated, even rates of turn of the order of 400°/second such as are experienced in missiles. This is because the gyroscope can be given a bias by the magnetic mirror such that it is always operating on (or close to) a linear part of the frequency difference (Δf) of the two beams 2, 2' versus rate of turn (Ω) characteristic as indicated in FIG. 6, the linear portion used depending on whether a positive or negative bias is applied. The essence of the present invention is to change quickly from one bias to the opposite bias when a given rate of turn would otherwise involve operating on an unacceptable non-linear portion of FIG. 6 or in the lock-in region indicated at L. The speed of switching the bias is so fast that fringe counts by a photodetector subjected to a combination of the light beams 2, 2' taken out of the ring laser are not lost which means that the output of the gyroscope is extremely accurate for all rates of turn, including very low rates which would normally not give rise to an output due to the problem of lock-in.

The magnetically saturable film 6 is preferably of the thin film type as is the magneto-optic layer 3 with the two films having substantially the same product of cross-sectional area (A) and magnetic flux (M), whereby $M_1 \times A_1 = M_2 \times A_2$.

With the bias mirror of FIGS. 1 and 2 there arises a secondary advantage from the present invention which is that the magnetically saturable film 6 maintains the magneto-optic layer 3 saturated.

Figure 3:
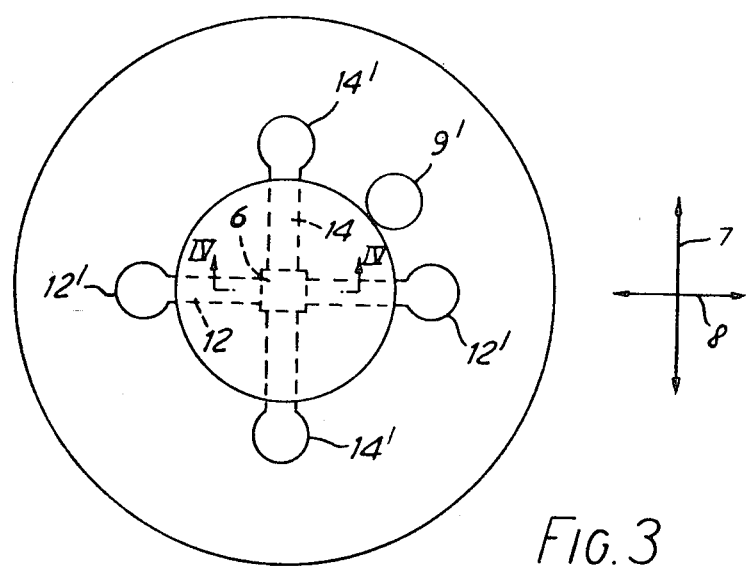
FIG. 3 is a plan view of an alternative device.
Figure 4:
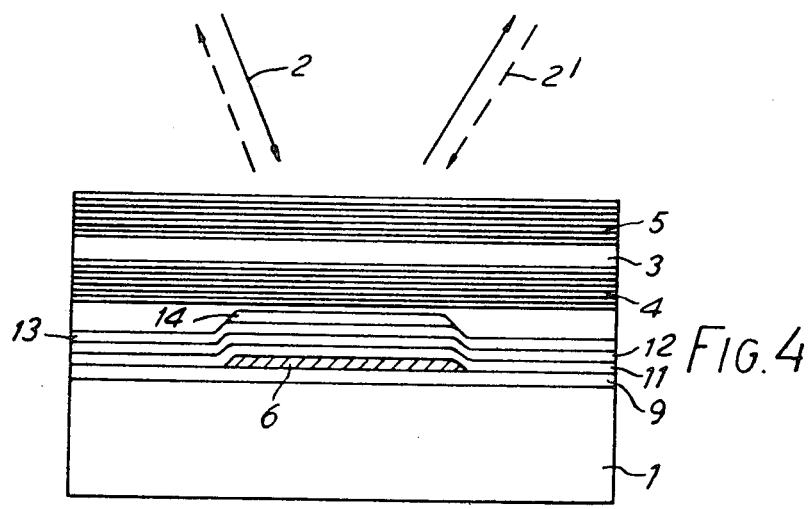
FIG. 4 is a section on the line IV—IV of FIG. 3.

The embodiment of FIGS. 3 and 4 is very similar to that of FIGS. 1 and 2 and like parts have similar reference numerals. The difference between these two embodiments is that the magnetic field applied to the magnetic film 6 in the first embodiment is at an angle to the hard and easy magnetic axes 7 and 8, whereas in the embodiment of FIGS. 1 and 2, two magnetic fields are applied to the film 6, one in the direction of the easy magnetic axis 7 and the other in the direction of the hard magnetic axis 8. This is achieved by providing a further insulating layer 13 on top of the stripline conductor 12, and a further stripline conductor 14 on top of the insulating layer 13.

The stripline conductor 12 is oriented in the direction of the hard axis 8, and the conductor 14 in the direction of the easy axis 7. However, since the conductors produce a magnetic field at right angles to their length, then the conductor 12 provides an easy axis field and the conductor 14 a hard axis field. Contact pads 14' are provided for the further stripline conductor 14, the ground conducting layer 9 acting as the return path for both the conductors 12 and 14. In order to achieve switching of the magnetic field on the magnetic film 6 by rotation, as opposed to domain wall motion, it is necessary to ensure that the current applied to the conductor 14 (hard axis) is terminated before that applied to the conductor 12 (easy axis).

FIGS. 2 and 4 show the bottom of the dielectric layer 4 spaced from the top of the uppermost conductor and this may or may not be necessary, depending on the specific design of mirror. If necessary, the space will be filled by a dielecric material chosen so that its thickness will create the correct phase relationship of light incident upon itself and other layers in the optical stack.

Figure 5:
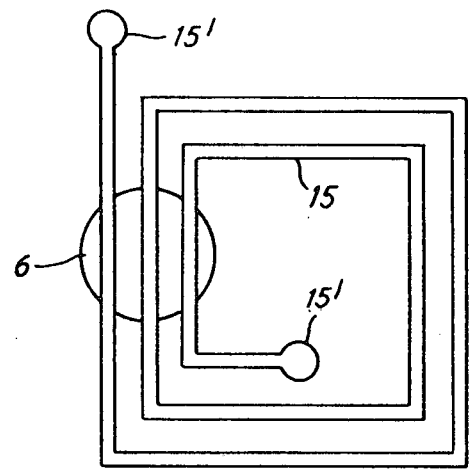
FIG. 5 is a plan view of a modification of the embodiment of FIG. 1 or 3.

The embodiments of FIGS. 1 and 3 employ single conductors 12 and 14 but these may be replaced by a multi-turn conductor or a plurality of conductors in order to increase the magnetic per unit current. A diagrammatic representation of the use of a multi-turn conductor 15 with the magnetic film 6 is shown in FIG. 5 of the drawings.

The garnet magneto-optic layers 3 of the illustrated embodiments may be replaced by iron magneto-optic layers.

I claim:

1. A magneto-optical phase-modulating device comprising a magneto-optic layer forming part of an optical stack and upon which, in use, light is incident and to which is applied a reversible magnetic field, a layer of magnetic material adjacent the magneto-optic layer, and at least two flat, low inductance conductors connected in series and disposed one on either side of the layer of magnetic material, in use the conductors having a electric current applied thereto to magnetize the layer of magnetic material, which magnetization is switchable between one direction and the opposite direction by reversing the current in the conductors and which induces an external field of a strength to magnetically affect the magneto-optic layer such that the consequent magnetization thereof is also switched between said one direction and the opposite direction as the field associated with the layer of magnetic material is switched.

2. A device according to claim 1, wherein at least one conductor is a stripline conductor and another conductor is in the form of a ground conducting layer.

3. A device according to claim 1, wherein each conductor is a stripline conductor.

4. A device according to claim 1, wherein the two conductors have substantially the same width (W) and are spaced (S) apart in accordance with the relationship $S \leq 0.1W$.

5. A device according to claim 1, wherein each conductor comprises a plurality of conductors.

6. A device according to any of claims 1, wherein each conductor is a multi-turn conductor.

7. A device according to claim 1, wherein the magnetic material layer is in the form of a thin film.

8. A device according to claim 1, wherein the magneto-optic layer is in the form of a thin film.

9. A device according to claim 1, wherein the product of the cross-sectional area and the magnetic flux of the magnetic layer is substantially equal to that of the magneto-optic layer.

10. A device according to claim 1, wherein the direction of magnetisation of the magneto-optic layer and the magnetic layer is changed by rotation of the magnetic flux.

11. A device according to claim 1, wherein the direction of the magnetic field applied to the layer of magnetic material is at angle to the hard magnetic axis of that layer, whereby in use the magnetic field is switched by rotation upon a change in direction of the electric current applied to the conductors.

12. A device according to claim 1, wherein at least one further conductor is provided and two magnetic fields are in use, applied to the layer of magnetic material, one substantially in the direction of the easy magnetic axis of that layer and the other substantially in the direction of the hard magnetic axis of that layer, the field in the direction of the hard axis being switched off prior to the field in the direction of the easy axis by terminating at different times the current applied between said at least two conductors and between said further conductor and an associated conductor.

13. A device according to claim 12, wherein the associated conductor is one of said at least two conductors.

14. A device according to claim 1, wherein the layer of magnetic material is composed of a magnetically saturable material having a square loop hysteresis characteristic.

* * * * *